United States Patent
Bang

[19]

[11] Patent Number: 5,920,440
[45] Date of Patent: Jul. 6, 1999

[54] GRAY CODE DECODING CIRCUIT OF A HARD DISK DRIVE

[75] Inventor: Ho-Yul Bang, Kyungki-do, Rep. of Korea

[73] Assignee: Samsung Electronics Co., Ltd., Suwon, Japan

[21] Appl. No.: 08/853,799

[22] Filed: May 9, 1997

Related U.S. Application Data

[63] Continuation of application No. 08/358,905, Dec. 19, 1994, abandoned.

[30] Foreign Application Priority Data

Dec. 18, 1993 [KR] Rep. of Korea ..................... 93-28395

[51] Int. Cl.$^6$ ..................................................... G11B 5/09
[52] U.S. Cl. ............................... 360/51; 360/49; 360/46; 360/77.08
[58] Field of Search ................................. 360/48, 49, 51, 360/46, 77.08; 341/97

[56] References Cited

U.S. PATENT DOCUMENTS 5,442,499  8/1995  Emori ................................... 360/77.08

*Primary Examiner*—Aristotelis M. Psitos
*Assistant Examiner*—Alan Faber
*Attorney, Agent, or Firm*—Jones, Volentine, Steinberg & Whitt, L.L.P.

[57] ABSTRACT

A gray code decoding circuit of a hard disk drive includes a servo pattern area, a data pick-up device, and a pattern detecting device. The servo pattern area has data recorded as a gray code. The data pick-up device detects the recorded data, converts it into encoded read data, and outputs the encoded read data. The pattern detecting device detects a position of the servo pattern area in response to the encoded read data and outputs a reference pulse. The gray code decoding circuit also contains a gray window generating device, a synchronous signal generating device, a gray code extracting device, and a gray-binary converting device. The gray window generating device divides the encoded read data by a division ratio, converts the divided encoded read data into gray data, outputs the gray data, and generates a first synchronous signal after counting by a system clock to a first value. The synchronous signal generating device outputs first and second window signals in response to a second synchronous signal. The gray code data extracting device outputs the second synchronous signal to the synchronous signal generating device and outputs first and second information data taken from the gray data in response to the first and second window signals, respectively. The gray-binary converting device converts the gray code of the first and second information data to a binary code.

8 Claims, 5 Drawing Sheets

GRAY CODE DECODING CIRCUIT OF A HARD DISK DRIVE

This is a Continuation of application Ser. No. 08/359,905, filed on Dec. 19, 1994, which was abandoned upon the filing hereof.

BACKGROUND OF THE INVENTION

The present invention relates to a gray code decoding circuit of a hard disk drive and more particularly to a gray code decoding circuit which can decode a gray code recorded in a servo pattern area of a disk.

Generally, a disk of a hard disk drive having a high rotational speed, large capacitance, and high density maintains a constant rotational speed. The disk generally contains a servo pattern 1 where all kinds of information capable of effectively controlling a head position is recorded. As shown in FIG. 1, the servo pattern 1 generally includes a write/read recovery area 2, a pattern area 3 in which a specific pattern or a direct current gap is recorded, an index mark IM area 4, a gray code GC area 5, a servo track mode STM area 6, and a post amble data PAD area 7.

The write/read recovery area 2 is formed, considering the transition time required for the hard disk drive to change from a write mode to a read mode, to prevent errors caused by transition noise. These errors can include, for example, barkhausen noise generated by a magnetic flux change applied to the head. In the pattern area 3, the direct current gap or the specific pattern is recorded for synchronizing a detection timing of the servo pattern with a system clock. The pattern area 3 is also referred to as an address mark AM area. On the index mark IM area 4, index information of the disk is recorded. On the gray code GC area 5, identification ID of the track of the disk is recorded as a gray code GC. On the servo track mode STM area 6, a burst signal used for controlling a track following is recorded. A frequency of the servo pattern shown in FIG. 1 is approximately 4 MHz.

Moreover, the gray code used for recording identification of track within the gray code GC area 5 is comprised of 12 bits (in the configuration of 4096 cylinder). The reason why the gray code is used for discriminating the identification of the track is in that the gray code can be easily recognized as being converted by one bit when the head moves track by track, compared to the conversation of binary or decimal codes.

The gray code recorded on the disk, as shown in FIG. 1, is divided into gray synchronous signals $[S_{11}, \ldots S_0]$ and gray data $[D_{11}, \ldots D_0]$.

Therefore, the length of the gray code area for the servo pattern is obtained by the following equations and equalities.

SCLK (system clock)=32 MHz=31.25 nsec=1 T 1 cell=4 T=125 nsec 1 di-pulse=2 cell=250 nsec Consequently, the length of gray code area, L, is determined as follows:

L=12 gray synchronous signal+12 gray data
  =24 di-pulse=48 cell
  =48×125 nsec=6 msec FIG. 2 is a diagram illustrating a gray code decoding circuit of a conventional hard disk drive. FIG. 3 is a timing diagram illustrating a conventional gray code decoding operation.

An operation of a conventional gray code decoding circuit of FIG. 2 will be herein discussed with reference to FIG. 3.

When a disk 12 rotates by the operation of a spindle motor (not shown), a head 14 reads the signal stored within the servo area shown in FIG. 1 from the disk 12 and then transmits the read signal to a read/write channel part 16. The signal may be a head pickup signal waveform as illustrated in FIG. 3, The read/write channel part 16 is typically comprised of a peak detector, a hysteresis comparator, and a one-shot data generator. The read/write channel part 16 converts the read signal into digitalized encoded read data ("ERD") and outputs the ERD to a pattern detector 18.

The pattern detector 18 makes the system clock SCLK and the servo pattern synchronous to each other, generates a reference pulse RP indicating the start of the servo area, as shown in FIG. 3, and outputs the reference pulse RP to a gray code decoder 20.

Then, the gray code decoder 20 decodes the continuously received ERD into gray data GD in response to the reference pulse RP, as shown in FIG. 3. Furthermore, the gray code decoder 20 counts a data pulse received following the reference pulse RP to generate a gray synchronous window GSW and a gray data window GDW, as shown in FIG. 3. Thereafter, in accordance with the gray synchronous window GSW and the gray data window GDW, the gray code decoder 20 decodes the gray data GD into a gray code GC and then outputs the gray code GC to the input terminal of a gray-binary converter 22.

As shown in FIG. 2, the gray-binary converter 22 then converts the gray code GC to a binary code B and outputs the binary code B to a microprocessing unit MPU 24. At this time, the binary code is binary data providing identification information for a track.

However, in a hard disk drive operating at a high speed, the conventional gray code decoding circuit as set forth above cannot accurately access the gray code because of the following problems, thereby making the reliability thereof seriously unstable.

Firstly, the maximum seek time taken until the head arrives at its destination depends upon the length of the gray code, which can be an important problem. In other words, the time required for the head to read and pass the gray code of the servo pattern previously recorded on the disk needs to be reduced in order to have a rapid seek time.

Secondly, the reliability of the gray code detector can be lowered by a bit shift of the ERD. The gray code decoder counts the data pulse received following the reference pulse RP and generates the gray synchronous window GSW and the gray data window GDW. When a bit shift of the ERD is increased due to the timing shift generated by the synchronism between the system clock and servo pattern and a jitter of a spindle motor, the reliability of the gray code decoder is lowered.

SUMMARY OF THE INVENTION

Therefore, an object of the present invention is to provide a gray code decoding circuit which can be used at an optimum state in a hard disk drive having a high speed, large capacitance and high density.

Another object of the present invention is to provide a gray code decoding circuit which can access at a high speed a gray code recorded on a hard disk.

Still another object of the present invention is to provide a gray code decoding circuit which generates a gray synchronous window GSW and a gray data window GDW in synchronism with a gray synchronous signal of a gray code recorded on a disk of hard disk drive and can thereby minimize timing shift caused by the non-synchronism between a system clock and a servo pattern and errors caused by jitter of a spindle motor.

Still yet another object of the present invention is to provide a track identification information recording pattern of a hard disk drive pursuing a high speed and large capacitance.

To achieve these objects of the present invention, there is provided a gray code decoding circuit of a hard disk drive including a recording medium having a servo pattern area formed of data synchronous signals, and first and second information data disposed between the data synchronous signals for recording track identification information of the recording medium as a gray code, a data pick-up device for detecting the data recorded in the recording medium, converting the data into encoded read data and outputting the encoded read data, and a pattern detecting device for detecting the position of the servo pattern area in response to the encoded read data from the data pick-up device and outputs a reference pulse corresponding thereto, comprising a gray synchronous window generating device for dividing the encoded read data in a predetermined division ratio, in response to the input state of the reference pulse, converting and outputting the divided encoded read data to gray data, and generating a gray synchronous window signal after counting a given system clock to a given first counting value in synchronism with the reference pulse; a synchronous window generating device for outputting a consecutive gray synchronous window signal which detects first and second information data window signals for transmitting the first and second information data and the data synchronous signal, in response to the input of a given synchronous signal, and outputting a data gate signal responsive to the first and second information data window signals; a gray code data extracting device for outputting the synchronous signal to the synchronous window generating device, in response to the gray synchronous window signal and the consecutive gray synchronous window signal, and outputting the first and second information data from the gray data in response to the first and second information data window signals; and a gray-binary converting device for converting the gray code of the first and second information data from the gray code to a binary code in response to the data gate signal.

BRIEF DESCRIPTION OF THE DRAWINGS

The following is a detailed description of this invention by the reference of the attached drawings.

DETAILED DESCRIPTION OF THE PREFERRED EMBODIMENTS

Figure 4:
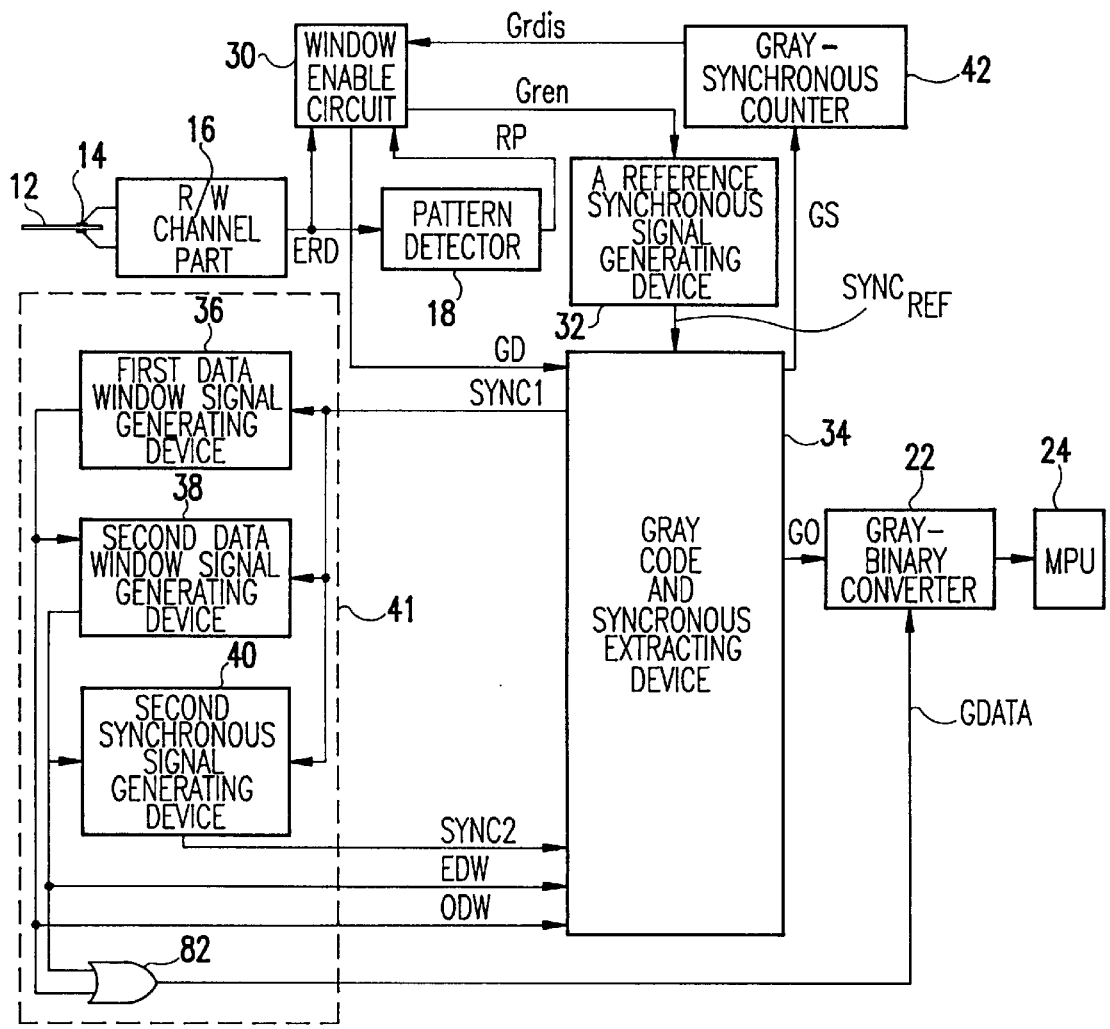
FIG. 4 is a block diagram illustrating the gray code decoding circuit of the hard disk drive according to a preferred embodiment of the present invention.

FIG. 4 is a block diagram illustrating the gray code decoding circuit of a hard disk drive according to a preferred embodiment of the present invention. The disk 12 shown in FIG. 4 includes the same servo pattern area as FIG. 1, on which identification information of the track according to the present invention is recorded as a gray code, although the content of the gray code area 5 is different as described below.

Figure 5:
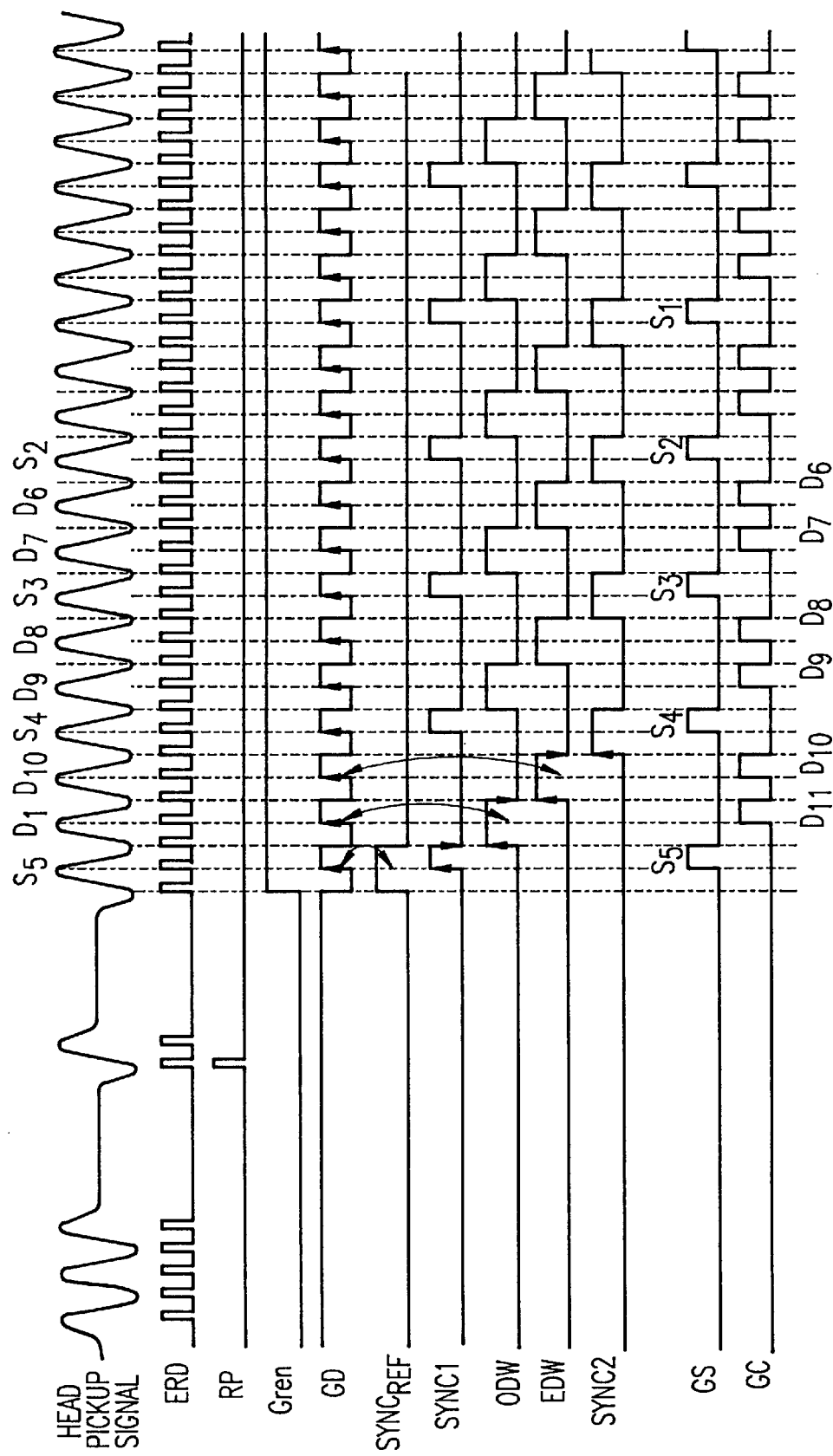
FIG. 5 is a timing diagram illustrating a gray code decoding operation of FIG. 4.

FIG. 5 is a timing diagram illustrating a gray code decoding operation of FIG. 4, in which a gray code stream at the time when the gray code is picked-up and reproduced is shown.

Figure 1:
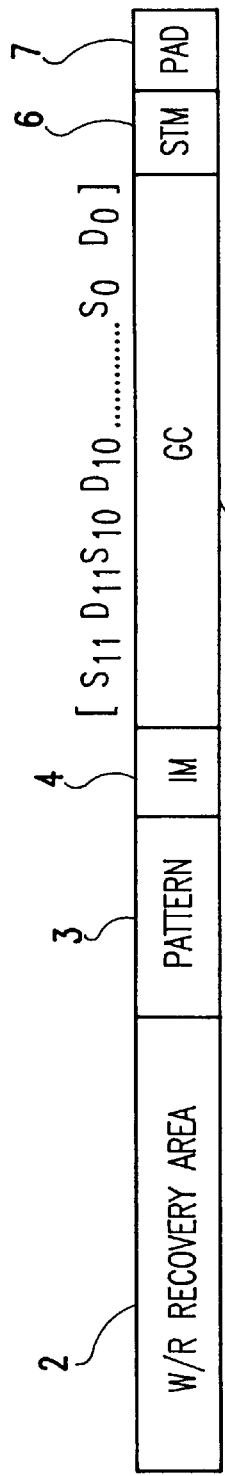
FIG. 1 is a view showing a configuration of a servo pattern of a hard disk drive.
Figure 2:
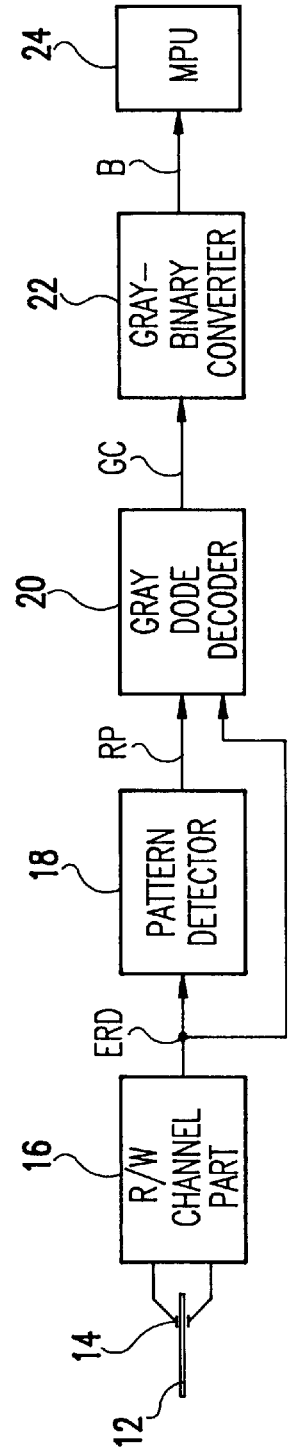
FIG. 2 is a block diagram illustrating the gray code decoding circuit of a conventional hard disk drive.
Figure 3:
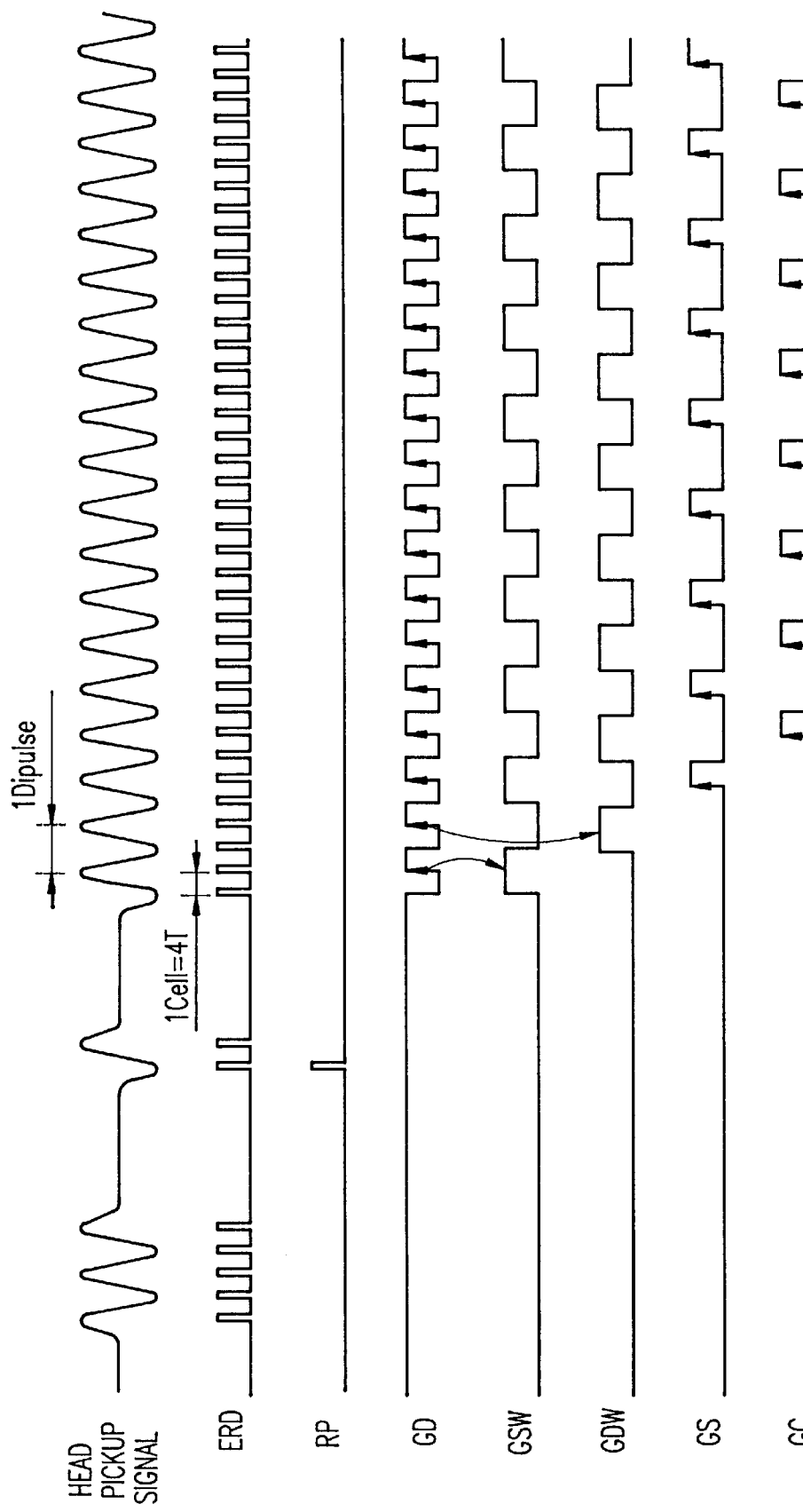
FIG. 3 is a timing diagram illustrating a conventional gray code decoding operation.

In contrast to a conventional way, the identification information of the track according to the present invention has two sets of gray data positioned between gray synchronous signals, rather than just one. In other words, in a conventional way, the gray synchronous signal and the gray data are located in a consecutive order as shown in FIG. 1, i.e., $S_{11}D_{11}S_{10}D_{10} \ldots S_0D_0$. In the present invention, odd gray data and even gray data are respectively located between the gray synchronous signals, as shown in FIG. 5, i.e., $S_5D_{11}D_{10}S_4D_9D_8 \ldots S_0D_1D_0$.

An explanation of an operation of FIG. 4 will be given in detail with reference to FIG. 5. The head 14 picks up the data recorded in the disk 12 and the picked-up head pickup signal is outputted to a read/write channel part 16. The read/write channel part 16 receives the head pickup signal, digitally converts the head pickup signal to the ERD, and outputs the ERD to a pattern detector 18 and a window enable circuit 30.

The pattern detector 18 detects a specific pattern recorded in the ERD and generates a reference pulse RP informing the start of servo area, as illustrated in FIG. 5. That is, the pattern detector 18 detects a direct current-gap interval of the servo pattern, generates the reference pulse RP in synchronism with a system clock SCLK (preferably 32 MHz) according to the detecting result and outputs the reference pulse RP to the window enable circuit 30.

The window enable circuit 30 receives the ERD from the read/write channel part 16 in response to the input of the reference pulse RP. Thereafter, the window enable circuit 30 divides the ERD by two and outputs the divided ERD as gray data GD, as shown in FIG. 5. At the same time, while receiving the ERD, the window enable circuit 30 outputs a gray enable signal Gren. The gray data GD inputs to a gray code and synchronous extracting device 34 and the gray enable signal Gren inputs to a first synchronous window signal generating device 32.

The first synchronous signal generating device 32 counts by the system clock SCLK according to a predetermined counting ratio in response to the gray enable signal Gren, and outputs a first synchronous signal SYNC1 shown in FIG. 5. The first synchronous signal SYNC1 responds to the input of the gray enable signal Gren and is changed to a logic "high" state. Also, upon completion of counting of the inputted system clock SCLK in the predetermined counting ratio, the first synchronous signal SYNC1 is changed to a logic "low" state, as shown in FIG. 5.

The reference synchronous signal $SYNC_{REF}$ is a signal for detecting gray synchronous data $S_5$ positioned at a first (odd) location of the gray data GD. $SYNC_{REF}$ is input to the gray code and synchronous extracting device 34.

The gray code and synchronous extracting device 34 detects the gray synchronous data $S_5$ of the gray data GD in response to the input of the reference synchoronous signal $SYNC_{REF}$. In addition, the gray code and synchronous extracting device 34 outputs a first synchronous signal SYNC1 corresponding to the detection of the gray synchronous data $S_5$, and outputs a gray synchronous signal GS to a gray synchronous counter 42.

In this case, the first synchronous signal SYNC1 inputs to a first data window signal generating device 36 within a synchronous window signal generating device 41. The first data window signal generating device 36 responds to the falling edge of the first synchronous signal SYNC1 and outputs an odd data window signal ODW, as shown in FIG. 5.

The odd data window signal ODW is input to a second data window signal generating device 38 and the gray code and synchronous extracting device 34, respectively. The second data window signal generating device 38 responds to the falling edge of the first synchronous signal SYNC1 and, after counting by the system clock SCLK according to a predetermined counting ratio, outputs an even data window signal EDW, as shown in FIG. 5.

The even data window signal EDW inputs to a third synchronous signal generating device 40 and the gray code and synchronous extracting device 34, respectively. The third synchronous signal generating device 40 responds to the falling edge of the first synchronous signal SYNC1 and, after counting by the system clock SCLK according to a predetermined counting ratio, generates a second synchronous signal SYNC2, as shown in FIG. 5. The third synchronous signal generating device 40 then outputs the signal SYNC2 to the gray code and synchronous extracting device 34.

Thereafter, an OR gate 82 within the synchronous window signal generating device 41 outputs a data gate signal GDATA corresponding to the outputs of odd and even data window signals ODW and EDW to a gray-binary converter 22.

Therefore, when the second synchronous signal SYNC2 is outputted from the gray code and synchronous extracting device 34, the synchronous window signal generating device 41 sequentially outputs the odd data window signal ODW, the even data window signal EDW, and the second synchronous signal SYNC2, as shown in FIG. 5, in response to the first synchronous signal SYNC1.

A frequency of the servo pattern according a preferred embodiment of the present invention is shown by the following equations and equalities.

1 cell=3 T=93.75 nsec 1 di-pulse=2 cell=6 T

Consequently, the length of gray code area L can be determined as follows.

L=6 gray synchronous signal+12 gray code

=18 di-pulse

=36 cell=36×93.75 nsec

=3.375 $\mu$sec

In the meanwhile, the gray code and synchronous extracting device 34 detects gray data $D_{11}$ positioned at an odd location which is placed following the gray synchronous data $S_5$ in the gray data GD, in response to the input of the odd data window signal ODW. And then, the gray code and synchronous extracting device 34 generates the gray code GC corresponding to the detection of the gray data $D_{11}$, as shown in FIG. 5 and outputs the gray code GC to the gray-binary converter 22. Moreover, if receiving the even data window signal EDW, the gray code and synchronous extracting device 34 detects gray data $D_{10}$ positioned at an even location in the gray data GD and thereafter, generates the gray code GC corresponding to the detection of the gray data $D_{10}$ to output the gray code GC to the gray-binary converter 22.

The gray code and synchronous extracting device 34 detects gray synchronous data $S_4$ positioned at a second location consecutively increased from the first gray synchronous data $S_5$ in the gray data GD, in response to the input of the second synchronous signal SYNC2. And then, the gray code and synchronous extracting device 34 outputs the first synchronous signal SYNC1 corresponding to the detection of the second gray synchronous data $S_4$ to the synchronous window generating device 41 and outputs the gray synchronous signal GS to the gray synchronous counter 42.

At this time, the synchronous window signal generating device 41 sequentially outputs the odd data window signal ODW, the even data window signal EDW, and the second synchronous signal SYNC2, as discussed above, in response to the first synchronous signal SYNC1 and proceeds as shown above.

Thus, the gray code and synchronous extracting device 34 transmits odd gray data $D_9$ and even gray data $D_8$ of the gray data GD placed next to the second gray synchronous data $S_4$ to the gray code GC by means of the odd data window signal ODW and the even data window signal EDW, respectively. Also, the gray code and synchronous extracting device 34 detects second gray synchronous data $S_3$ in response to the input of the third synchronous signal SYNC2.

The gray-binary converter 22 converts the gray code GC to the binary data, in response to the input of the data gate signal GDATA, and outputs the binary data to the MPU 24. Here, the MPU 24 recognizes the binary data outputted from the gray-binary converter 22 as track identification information and controls the hard disk drive to move the head 12 to a target track.

When the gray synchronous counter 42 counts the input of the gray synchronous signal GS outputted from the gray code and synchronous extracting device 34 and reaches a predetermined counting value, the gray synchronous counter 42 outputs a gray disable signal Grdis to the window enable circuit 30. At this time, the window enable circuit 30 makes the output state of the gray enable signal Gren disabled, in response to the input of the gray disable signal Grdis, and disables the generation of the reference synchronous signal $SYNC_{REF}$. The counting value of the gray synchronous counter 42 is equal to the number of gray synchronous signals recorded on the servo pattern of the disk.

As discussed above, if the gray synchronous data $S_5$ placed in a leading position among the gray codes of the servo pattern is detected by the reference synchronous signal $SYNC_{REF}$, in synchronism therewith, the odd data window signal ODW and the even data window signal EDW are sequentially transmitted. Then, the second synchronous signal SYNC2 is generated in synchronism with the falling edge of the even data window signal EDW for detecting the even gray data.

Figure 6:
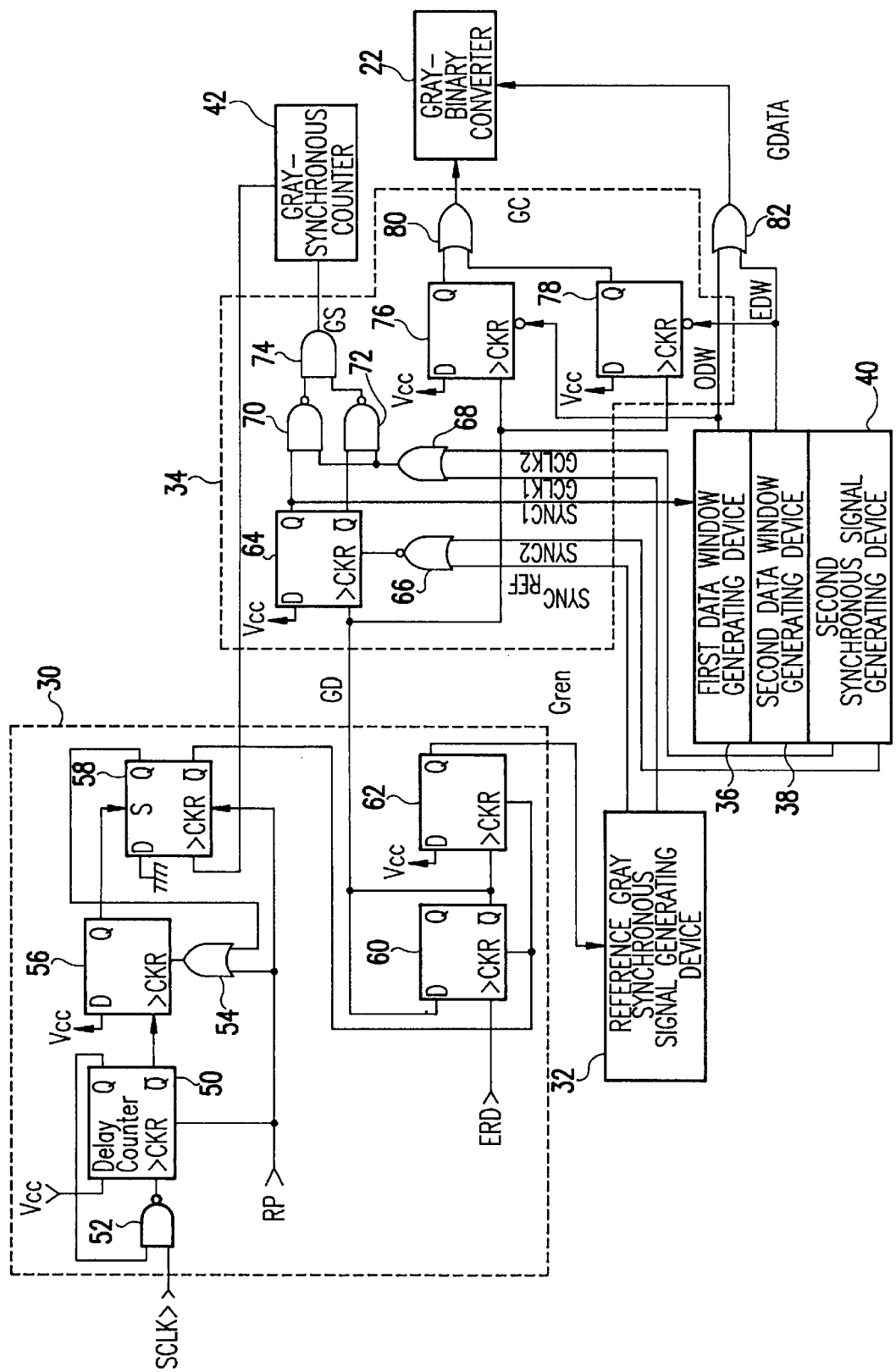
FIG. 6 is a circuit diagram illustrating a detailed embodiment of the gray detecting circuit of FIG. 4.

FIG. 6 is a circuit diagram illustrating a detailed embodiment of the gray code decoding circuit of FIG. 4, in which the detailed configurations of the window enable circuit 30 and the gray code and synchronous extracting device 34 are illustrated, connected with peripheral circuits thereof.

When the reference pulse RP inputs to the window enable circuit 30 in the state that the system clock SCLK inputs, a delay counter 50, a first flip-flop ("1FF") 56 connected to the delay counter 50, and second flip-flop ("2FF") 58 receive a reset input and are then initialized. When the 2FF 58 is reset, the reverse output terminal $\overline{Q}$ thereof is changed to the logic "high" state to cause third and fourth flip-flops ("3FF" and "4FF," respectively) 60 and 62 connected to the 2FF 58 to be reset. In the above state, when the system clock SCLK inputs to a third NAND gate 52, the delay counter 50 delays the system clock SCLK for a predetermined period of time, outputs the signal of the "high" state to an output terminal Q, and is then latched until the next reference pulse RP inputs. The 1FF 56, connected to the reverse output terminal $\overline{Q}$ of the delay counter 50, responds to the input signal of the "high" state and outputs the signal to a set terminal S of the 2FF 58 through the output terminal Q thereof. At this time, the 2FF 58 is set by the input signal of the "high" state and outputs the signals of the "high" state and the "low" state through the output terminals Q and $\overline{Q}$, respectively. Accordingly, the 1FF 56 is reset and thus releases the set of the 2FF 58, and the 3FF and 4FF 60 and 62 are released in the reset states.

The 3FF 60 in the release state divides the input of ERD by two to output the divided ERD to the gray data GD. The gray data GD inputs to the clock input terminals CK of the 4FF 62, a fifth flip-flop ("5FF") 64, a sixth flip-flop ("6FF") 76, and a seventh flip-flop ("7FF") 78, respectively. The 4FF 62 outputs the gray enable signal Gren as shown in FIG. 5 to the first gray synchronous window generating device 32 in response to the initial input of the gray data GD. At this time, the gray enable signal Gren outputted from the 4FF 62 is maintained while the gray data GD inputs. This will be understood by the following description.

The first synchronous signal generating device 32 counts the system clock SCLK in a predetermined counting ratio in response to the window enable signal Gren. Upon completion of the counting operation, the first gray synchronous window generating device 32 outputs the reference synchronous signal $SYNC_{REF}$ to the reset terminal of the 5FF 64 through a NOR gate 66, and outputs a first synchronous clock GCLK1 for transmitting the first synchronous signal SYNC1 to first and second NAND gates 70 and 72 through a first OR gate 68.

At this time, the 5FF 64 is released in the reset state by the output signal of the logic "low" state of the NOR gate 66. Thus, the 5FF 64 receives the gray data GD at the clock input terminal CK thereof as shown in FIG. 5 from the 3FF 60 within the enable interval of the reference synchronous signal $SYNC_{REF}$. Thereafter, the 5FF 64 responds to the rising edge of the gray synchronous data $S_5$ of the gray data GD, and generates and outputs the first synchronous signal SYNC1 to the first data window generating device 36 and the first NAND gate 70. In addition, the 6FF 64 outputs the reverse output signal to the second NAND gate 72.

At this time, the first and second NAND gates 70 and 72 receive the second synchronous signal SYNC1 and the reverse output signal of the 5FF 64, respectively, perform a NAND operation with the first synchronous clock GCLK1, and outputs the operation signal to a first AND gate 74. Then, the first AND gate 74 outputs the operation signal (synchronous detecting signal) GS to the gray synchronous counter 42. That is, the gates 70, 72 and 74 render the output change state of the 5FF 64 to be recognized by the gray synchronous counter 42.

If the gray synchronous counter 42 counts the synchronous detecting signal outputted from the first AND gate 74 and reaches a predetermined counting value, the gray synchronous counter 42 outputs the state signal corresponding thereto to the clock input terminal CK of the 2FF 58. Therefore, the 2FF 58 changes the output state thereof in response to the inputted state signal.

In the meanwhile, the first data window generating device 36 receives the first synchronous signal SYNC1 outputted from the 5FF 64, generates the odd data window signal ODW in response to the falling edge of the first synchronous signal SYNC1, and releases the reset state of the 6FF 76. At this time, the 6FF 76 released in the reset state latches the gray data GD inputted to the clock input terminal CK thereof and outputs the latched gray data GD as the gray code GC.

The second data window generating device 38 responds to the falling edge of the first synchronous signal SYNC1 and counts the system clock SCLK in a predetermined counting ratio. Then, the second data window generating device 38 generates the even data window signal EDW and releases the reset state of the 7FF 78. At this time, the 7FF 78 released in the reset state latches the gray data GD inputted to the clock input terminal CK thereof and outputs the latched gray data GD as the gray code GC.

Thereafter, a second OR gate 80 receives the gray codes GC from the 6FF and 7FF 76 and 78 and performs an OR operation, thus to output the gray code GC to the gray-binary converter 22.

Thus, the 6FF and 7FF 76 and 78 are respectively synchronous to the odd and even data window signals ODW and EDW generated from the first and second data window generating devices 36 and 38, and transmit two gray data positioned following the gray synchronous signal to the gray-binary converter 22, respectively.

In addition, the third synchronous signal generating device 40 responds to the falling edge of the first synchronous signal SYNC1 and counts by the system clock SCLK according to a predetermined counting ratio. Then, the third synchronous signal generating device 40 generates the second synchronous signal SYNC2 and outputs the signal SYNC2 to the NOR gate 66. Meanwhile, the third synchronous signal generating device 40 generates a second synchronous clock GCLK2 synchronous to the second synchronous signal SYNC2 and outputs the second synchronous clock GCLK2 to the OR gate 68.

Accordingly, the 5FF 64 is released in the reset state in correspondence with the second synchronous signal SYNC2 inputted through the NOR gate 66. At this time, the 5FF 64 detects the rising edge of the gray synchronous data $S_4$ during the third synchronous signal SYNC2 interval, and generates the first synchronous signal SYNC1 corresponding to the detecting result, thus to output the first synchronous signal SYNC1 to the first data window generating device 36.

The OR gate 82 receives the odd and even gray data window signals ODW and EDW and performs an OR operation to thereby generate a data gate signal GDATA which is outputted to the gray-binary converter 22.

At this time, the gray-binary converter 22 converts the gray code GC received from the gray code and synchronous extracting device 34 into the binary data, in correspondence with the data gate signal GDATA, and outputs the converted gray code GC to the MPU 24.

In the meanwhile, if the gray synchronous counter 42 counts the synchronous detecting signal GS outputted from the first AND gate 74 and reaches a predetermined counting value, the gray synchronous counter 42 generates the gray disable signal Grdis and outputs the signal Grdis to the clock input terminal CK of the 2FF 58. In response to the gray disable signal Grdis, the 2FF 58 latches the input signal of the logic "low" state inputted to the delay terminal D thereof and outputs a signal inverted to the logic "high" state to the reverse output terminal $\overline{Q}$. The 3FF and 4FF 60 and 62 lie in the reset state by the signal of the logic "high" state outputted from the reverse output terminal $\overline{Q}$ of the 2FF 58, and cut off the gray enable signal Gren, thereby stopping the generation of all window signals.

As earlier discussed, there is provided a gray code decoding circuit according to the present invention which has an advantage of accurately performing a gray code decoding operation by repeatedly generating a data window signal and a synchronous window signal, after the counter is reset to detect gray data and a gray synchronous signal for every bit of gray data. Further, there is provided a gray code decoding circuit according to the present invention which has an advantage of minimizing timing shift caused by the non-synchronism between a system clock and a servo pattern and errors caused by jitter of a spindle motor, for which odd and even gray data are detected and transmitted on the basis of gray synchronous data recorded in the gray code area.

Accordingly, the present invention is not limited to the specific examples described above. It should be understood that those of ordinary skill in the art will contemplate many variations and modifications to the foregoing examples that fall within the scope of the present invention as set forth in the attached claims.

What is claimed is:

1. A hard disk drive system, comprising:

a recording medium having a servo pattern area containing stored data comprising synchronous data and first and second information data disposed between the synchronous data for recording track identification information of the recording medium as a gray code, a data pick-up device for detecting the stored data recorded in the recording medium, converting the stored data into an encoded read data, and outputting the encoded read data;

a pattern detecting device for detecting a position of the servo pattern area in response to the encoded read data from the data pick-up device and for outputting a reference pulse corresponding to the detected position; and a gray code decoding circuit comprising:

a gray window generating device for dividing the encoded read data according to a predetermined division ratio in response to an input state of the reference pulse, converting the divided encoded read data to gray data comprising first and second information data, outputting the gray data, and generating a first synchronous signal after counting a given system clock to a first counting value in synchronism with the reference pulse;

a synchronous window signal generating device for outputting first and second data window signals in response to a second synchronous signal, for outputting a third synchronous signal in response to the second synchronous signal and the first and second data window signals, and for outputting a data gate signal responsive to said first and second data window signals;

a gray code data extracting device for outputting the second synchronous signal to the synchronous window signal generating device in response to the first synchronous signal and outputting the first and second information data in response to the first and second data window signals, respectively; and a gray-binary converting device for converting the gray code of the first and second information data to a binary code in response to the data gate signal.

2. The hard disk drive system as claimed in claim 1, wherein the synchronous window signal generating device comprises:

first data window signal generating means for counting by a system clock to a first counting value in response to a falling state of the second synchronous signal and generating the first data window signal;

second data window signal generating means for counting by the system clock to a second counting value in response to the falling state of the second synchronous signal and generating the second data window signal; and third synchronous signal generating means for counting by the system clock to a third counting value in response to the falling state of the second synchronous signal and generating the third synchronous signal.

3. A gray code decoding circuit for use in a recording device, comprising:

a first synchronous signal generator for generating a first synchronous signal;

a first data window signal generator for generating a first data window signal in response to the first synchronous signal;

a second data window generator for generating a second data window signal in response to the first synchronous signal and the first data window signal; and a second synchronous signal generator generating a second synchronous signal in response to the first synchronous signal and the second data window signal, wherein the first synchronous signal generator generates the first synchronous signal in response to one of the second synchronous signal and a separate reference synchronous signal.

4. The gray code decoding circuit of claim 3, further comprising a detecting circuit for generating a data gate signal for instructing the decoding of gray data when both the first and the second data window signals are generated.

5. The gray code decoding circuit of claim 3, wherein the reference synchronous signal is generated in response to a reference pulse on the recording device.

6. A method for decoding gray data for use in a recording device, comprising the steps of:

generating a first synchronous signal;

generating a first data window signal in response to the first synchronous signal;

generating a second data window signal in response to the first synchronous signal and the first data window signal; and generating a second synchronous signal in response to the first synchronous signal and the second data window signal, wherein the first synchronous signal is generated in response to the second synchronous signal and a separate reference synchronous signal.

7. The method for decoding gray data of claim 6, further comprising the step of generating a data gate signal for instructing the decoding of gray data when both the first and the second data window signals are generated.

8. The method for decoding gray data of claim 6, wherein the reference synchronous signal is generated in response to a reference pulse on the recording device.

* * * * *